United States Patent [19]
Gitman

[11] Patent Number: 4,874,311
[45] Date of Patent: Oct. 17, 1989

[54] METHOD AND APPARATUS FOR IMPROVED REGENERATIVE FURNACE

[75] Inventor: Gregory M. Gitman, Duluth, Ga.

[73] Assignee: American Combustion, Inc., Norcross, Ga.

[21] Appl. No.: 60,420

[22] Filed: Aug. 3, 1987

[51] Int. Cl.⁴ .............................................. F27B 14/00
[52] U.S. Cl. ...................................... 432/13; 432/135; 432/181; 432/30
[58] Field of Search .................. 432/179, 180, 181, 30

[56] References Cited

U.S. PATENT DOCUMENTS

| | | | |
|---|---|---|---|
| 1,279,697 | 9/1918 | Hook | 432/181 |
| 2,704,660 | 3/1955 | Bartu | 432/181 |
| 4,496,315 | 1/1985 | Savolskis | 432/30 |
| 4,506,726 | 3/1985 | Tsai | 432/181 |
| 4,540,361 | 9/1985 | Gagne | 432/181 |
| 4,671,765 | 6/1987 | Tsai | 65/135 |

*Primary Examiner*—Henry C. Yuen
*Attorney, Agent, or Firm*—Needle & Rosenberg

[57] ABSTRACT

A method and apparatus for improving the performance of a regenerative burner has a combustion chamber which receives and combusts controllable amounts of auxiliary fuel, an oxidizing gas, and possibly air to form hot combustion products. A controllable amount of a main fuel is then delivered to the combustion chamber and is pyrolyzed by the hot combustion products to produce a hot flame. By controlling the flame, one can maintain optimal temperature of the combustion air passing through the flame. Sensing means and computing means allow for automatic adjustments of fuel, oxygen and air flow to further maintain optimal combustion air temperatures.

13 Claims, 3 Drawing Sheets

METHOD AND APPARATUS FOR IMPROVED REGENERATIVE FURNACE

BACKGROUND OF THE INVENTION

This present invention relates to a combustion and control system for increasing the productivity and energy efficiency of regenerative furnaces, such as those used in high temperature heating and melting applications.

The typical system used for the melting of glass in industry is the regenerative furnace (or "glass tank"), which is constructed largely of brick and other refractories. In this glass furnace, glass is melted in a large refractory lined tank which is maintained at temperatures above 2750° F. As the molten glass is withdrawn from the furnace, recycled glass and/or new raw material, depending on the desired quality of the product being produced, is added to make up the charge.

The glass bath is heated by a series of burners which can be fueled with natural gas, petroleum gas, fuel oil, or low BTU gas (such as coke oven gas). Each side of the furnace is equipped with a series of burner ports, each of which contains at least one burner which injects a stream of fuel into preheated air (1300°-2000° F.) introduced into the furnace through the port. This air is preheated in regenerators, which are usually constructed in brick.

The heat from the escaping flue gases is captured by regenerators and then recaptured by preheating combustion air, which is blown through the heated bricks of the regenerator and into the furnace. Every fifteen to twenty minutes these flows of exhaust gases and combustion air are alternated, thus drawing the combustion air up through the regenerator, which is now hot, and the exhaust gases up through the regenerator, which is cold. As the flows are alternated, the flame traverses the glass tank in opposite directions. This operation results in the recovery of heat from the exhaust gases which increases flame temperature beyond levels that can be achieved with ambient combustion air, increases furnace productivity (pull rate) and improves furnace thermal efficiency.

The fuel stream is mixed with the preheated combustion air to generate a high temperature flame. The hot products of combustion pass through the furnace, transferring heat to the load as well as to the furnace roof, which then radiates heat to the load. The exhaust gases are channelled through the opposite regenerator providing heat to the refractory brick. The flue gases then pass through a reversing valve to the furnace stack. The furnace production rate is typically limited by heat flux, which can be transferred from the flame to the load without overheating the furnace crown. An increase in flame luminosity is always desired to raise the radiative heat transfer from the flame to gain furnace throughput and thermal efficiency.

There are, however, problems encountered in using the standard-type regenerative furnace. Glass furnace "campaigns" (the time between major overhauls) can run for many months or even years. At the end of a campaign, much of the refractory in the furnace has deteriorated significantly and the regenerators in particular will need substantial rework. During the campaign the gradual deterioration of the refractory in the regenerator results in plugging of the regenerator, reducing the cross sectional area of the refractory brick exposed to the flow of exhaust gases and combustion air. The result is a reduction in heat recovery and therefore a decrease in the temperature of preheated combustion air delivered to the ports, which in turn decreases total heat input and furnace productivity.

Throughout the glass furnace campaign, various impurities and foreign matter will be carried out of the tank by the exhaust gases and deposited on the regenerators. This increased resistance to air and exhaust gases flows results in the deterioration of combustion air flow, so that the furnace will not be capable of maintaining the necessary maximum firing rate required for maximum production rates.

A number of problems arise as a result of the switching cycle used in regenerative furnaces. For example, a common problem with traditional regenerative furnaces is the undesirable cooling effect on the furnace interior of the incoming air stream used to purge combustible gases from the regenerator while switching from one regenerator to the other. During this switching cycle, which consumes at least 3–5% of an entire working campaign, the fuel stream is shutdown and combustion air at lower than furnace temperatures is delivered to the furnace from the process of purging the regenerators. This purging of flue gases from the regenerator is necessary during the switching cycle to establish proper air flow throughout the regenerator prior to restarting the fuel flow. The shut down of the burner and the purging of the regenerator negatively impacts furnace productivity. During the switching cycle, the purge air is taking heat from the load and furnace linings reducing production capacity and furnace efficiency.

Also, the switched bed nature of the regenerative air heaters results in less than optimum flame temperatures and reduced recaptured heat inputs during the latter portion of each firing cycle because of gradual cooling of the regenerators. At the beginning of a cycle the temperature of the combustion air supplied to the glass tank burner will be 1900° F.–2400° F. However, at the end of a cycle, this temperature may be down to 1600° F.–2100° F., which will result in lower flame temperatures and which will limit the amount of glass which can be melted.

There exists a need, therefore, for means for improving the heat transfer efficiency between the flame produced in the combustion air and the product to be heated or melted through improved flame luminosity.

There also exists a need for means for stabilizing the heat input at a maximum allowable level based upon the properties of the furnace refractory.

There exists another need for such means for improving heat transfer efficiency and for stabilizing the heat input at a maximum allowable level to overcome deterioration in heat input due to the regenerator plugging throughout the furnace campaign.

There also exists a further need for means for providing heat input by using an auxiliary fuel and oxidizing gas stream to prevent furnace cooling when the main fuel is shut down during the switching period.

SUMMARY

The present invention relates to a combustion and control system which provides a means for maintaining instant heat input at an optimal level while improving flame luminosity in a regenerative furnace. An auxiliary combustion chamber is placed in the furnace so that it provides a luminous stream of hot, pyrolyzed combustible products directed to mix with hot combustion air delivered from a regenerator to create a final flame directed in the furnace above the material to be heated or melted. An auxiliary combustion chamber utilizes a stream of auxiliary fuel and oxidizing gas to generate hot combustion products delivering additional heat to the furnace. Controlled amounts of main fuel is also directed through the combustion chamber, where it mixes with the hot combustion products, pyrolyzes, and produces a hot, luminous stream of pyrolyzed combustion products which is directed into the furnace to mix with hot comubstion air to form a final flame pattern. By controlling the rates of the main fuel, preheated combustion air, auxiliary fuel, and oxidizing gas, a final flame of desired characteristic can be achieved and maintained. This allows greater control over the temperature inside the furnace, including the ability to overcome decreases in heat input due to plugged regenerators. Increased flame luminosity allows the maintenance of heat input at the maximum rate without overheating the furnace refractories.

Also, during the switching of regenerators, during the period when the delivery of the main fuel to the combustion chamber is shut off, the flows of auxiliary fuel and oxidizing gas are increased to produce an auxiliary switching flame. This flame acts to maintain a furnace temperature which is sufficient to prevent loss of furnace productivity and efficiency and thermal shock damage to the refractory.

Means for sensing and controlling the instant flows of the main fuel, auxiliary fuel, oxidizing gas and air are provided, as is a thermocouple for detecting the temperature of the combustion air preheating. An electronic computing means is also provided for continually determining the setpoints for the flow controlling means based upon inputs from the sensing means, the thermocouple and preprogrammed information. Alternatively, the preprogrammed information may be based upon predetermined preheating characteristics such as combustion air temperature declining cycle.

It is an object of this invention, therefore, to provide means for maintaining the optimal instant heat input to a regenerative furnace.

It is also an object of this invention to provide means for improving the heat transfer efficiency between the flame produced in the combustion air and the glass to be melted through improving flame luminosity.

It is a further object of this invention to provide means for stabilizing the heat input at a maximum allowable level based upon the properties of the furnace refractory.

It is still another object of this invention to provide means for improving heat transfer efficiency and for stabilizing the heat input at a maximum allowable level to overcome deterioration in heat input due to the regenerator plugging throughout the furnace campaign.

It is also an object of this invention to set forth means for providing heat input by using auxiliary fuel and an oxidizing gas stream to prevent the furnace from cooling when the main fuel is shut down during the switching period.

It is also an object of this invention to set forth means for providing a high momentum flame to impinge into the load from melting operations to provide heat input by using auxiliary oxidizing stream as sole oxidizer without preheated combustion air.

DESCRIPTION OF THE PREFERRED EMBODIMENT

Figure 1:
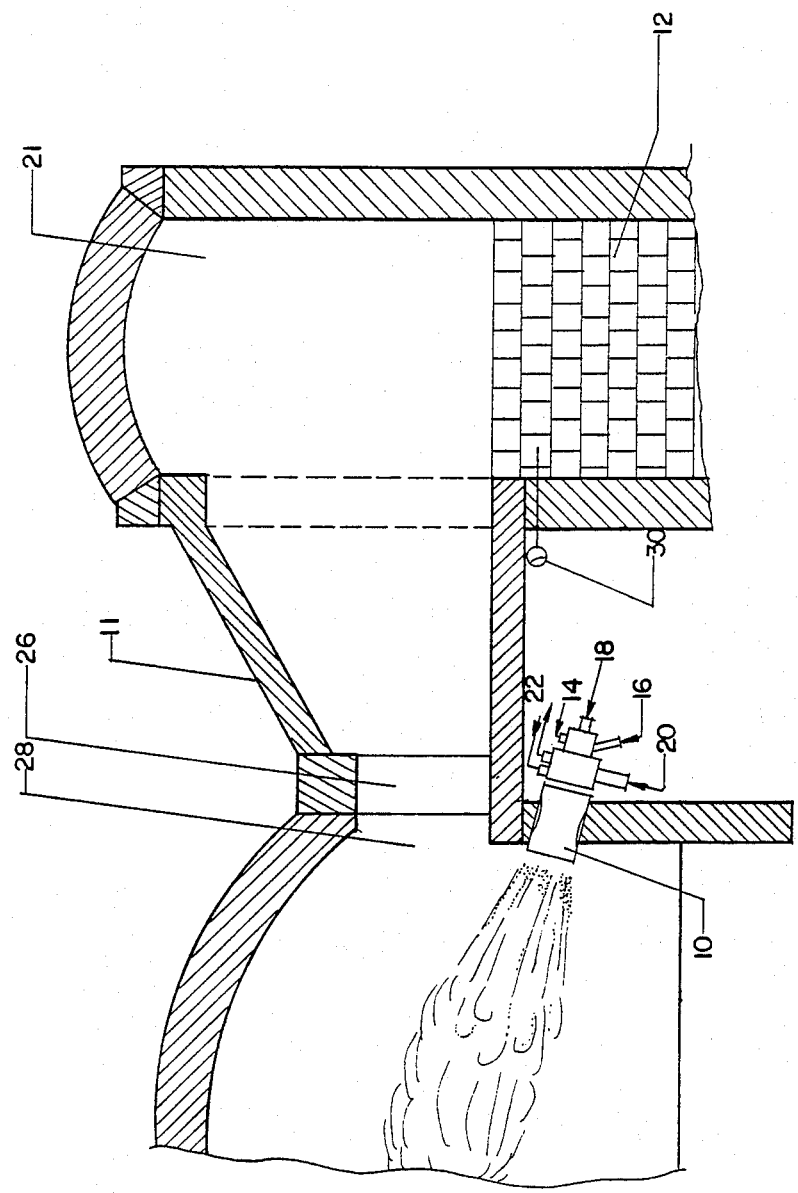
FIG. 1 shows a partial a cross-sectional view of the top of a regenerator and burner port with an auxiliary combustion chamber of the present invention.

FIG. 1 shows a partial cross section of a regenerative furnace having the high temperature combustion system of the present invention, and emphasizing the so called 'regenerator intake", or the transition from the regenerator section to the traditional burner section. The figure shows the addition of an auxiliary combustion chamber or "combustor" 10 to a regenerative furnace. The combustor 10 is used to pyrolyze the main fuel stream prior to its combustion with the air discharged from the brick checker 12 by mixing it with the products of combustion of auxiliary fuel and auxiliary oxidizing gas that have been burned in the auxiliary combustion chamber.

The combustor 10 has a main fuel inlet 14, an auxiliary fuel inlet 16, an oxidizing gas inlet 18, an air inlet 20, and a cooling water inlet 22. The main and auxiliary fuel are normally natural gas, and the oxidizing gas may be either oxygen, oxygen enriched air, or oxygen and air separately delivered into the combustion chamber.

The products of pyrolysis of main fuel from the combustor 10 are discharged as a hot luminous stream of combustible products directly into the hot air stream leaving the checker uptake 21 through the burner port 26. The preheated combustion air is mixed with hot luminous products of pyrolysis, thereby generating a final hot, luminous flame. The products of combustion of this final flame are passing over the molten glass in the glass tank 28 to maintain maximum glass production. Each burner part can be equipped with several such combustion chambers 10 directing a portion of the hot liminous pyrolytic product toward the stream of preheated combustion air delivered throughout the regenerator intake.

The flows of auxiliary fuel and oxidizing gas through these combustors 10 will be a function of the discharge temperature from the checker 12 measured continuously by the thermocouple 30, or predicted by the preprogrammed information of the predicted temperature decline.

Figure 2:
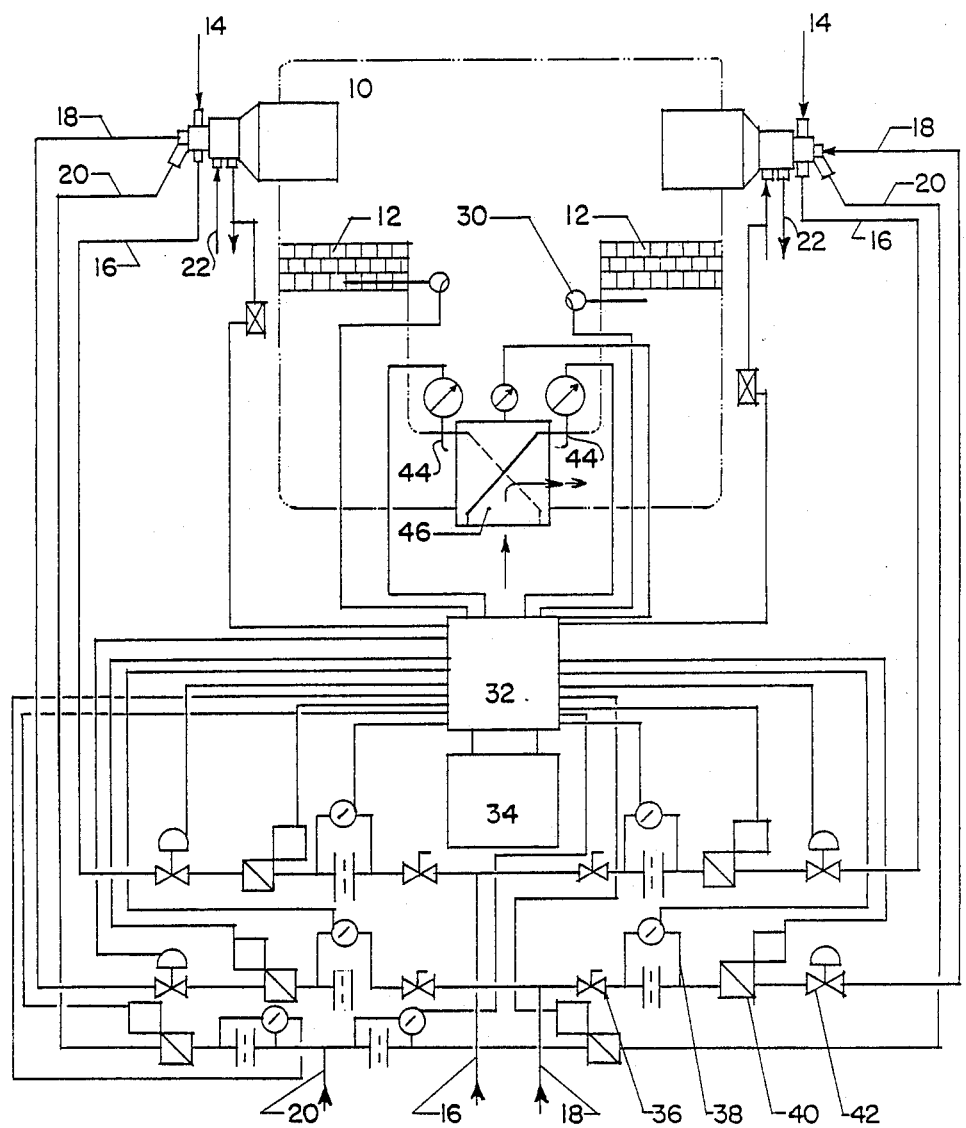
FIG. 2 is a schematic diagram of the control system for the high temperature combustion system of the present invention.

FIG. 2 depicts the overall control system for the high temperature burner system of the present invention. The combustor 10 shown is typical of the burners installed in both right-hand and left-hand ports. The vareous fluid flows to the combustors 10 are shown. Overall control of the system is accomplished with a solid state programmable logic controller 32 which is interconnected to the existing glass furnace controls 34. Control of the fluids in the various circuits is accomplished through the manual shut off valves 36, the flow measuring orifices and differential pressure transduces 38, the motorized flow control valves 40 and solenoid on/off valves 42.

Necessary instrumentation may be included to monitor the flow rates and temperatures of the combustion air throughout the checkers 12. Flow rates can be measured through the use of pilot tubes 44 or other flow measuring devices. The position of an air reversing valve 46 may be monitored to indicate the direction of air flow. Discharge temperatures of the air from the checkers 12 are monitored via thermocouples 30. The monitoring of temperature and flow rate of combustion air, preferably by a computerized control means, enables the combustion system to determine instant heat input with preheated combustion air and to establish instant flow of auxiliary gas and oxygen needed to maintain the optimum temperature and heat input throughout the entire furnace campaign.

OPERATION

The present invention uses stages combustion of natural gas or other hydrocarbon fuels to provide an extremely hot luminous flame envelope structure to improve heat transfer efficiency between the flame and the load and to stabilize heat input at the maximum allowable level based upon the properties of the furnace refractory.

Figure 3:
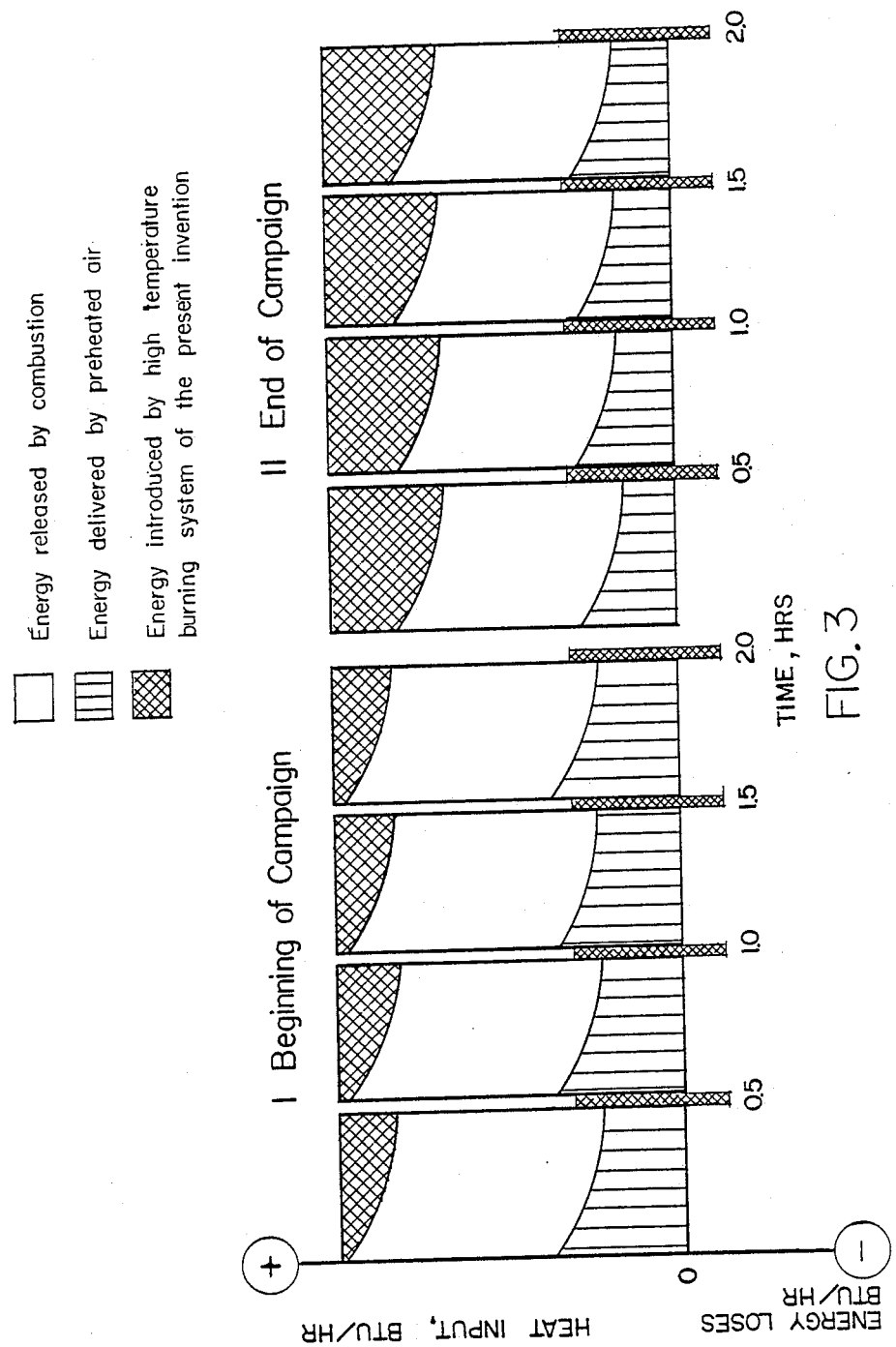
FIG. 3 illustrates the heat inputs for a regenerative furnace over a campaign.

The ability to stabilize heat input into the furnace at maximum allowable levels is accomplished by dynamically introducing additional heat inputs from the auxiliary combustor 10 due to the periodical drop in the temperature of the combustion air during the firing cycle. This incremental heat input in response to the drop in heat input from the conventional system is illustrated in FIG. 3.

The main hydrocarbon fuel stream proportioned to the main air flow through the checker 12 is pyrolysized in the combustor 10 prior to mixing with the hot combustion air delivered from the checkers 12. This process involves directing the main fuel stream throughout at least one combustor 10 in order to mix this stream with the hot combustion products produced from the combustion of an auxiliary fuel stream with an auxiliary oxidizing gas. The oxidizing gas may be either oxygen, oxygen enriched air or a separately delivered stream of air and oxygen. This process results in the pyrolysis of the main fuel stream prior to its mixing with the main hot air stream delivered from the checker 12. When mixed with the heated combustion air this pyrolysized main fuel stream produces a hot, luminous flame, and enhances heat transfer from the flame to the glass.

The amount of auxiliary fuel introduced into the combustor 10 is controlled to produce the added heat necessary to keep the total heat input into the furnace 11 at maximum permissible levels. This is accomplished by monitoring the temperature of the preheated combustion air delivered into the furnace 11 environment. Therefore, as the combustion air temperature decreases the system will respond by increasing the flows of auxiliary gas and oxygen or auxiliary gas, oxygen and air to generate the additional heat necessary to make up for the heat input losses due to the reduction in the temperature of the combustion air during the cycle as the heat stored in the regenerator is recaptured by the flow of combustion air.

During the switching from one checker 12 to another, the main fuel flow is shut down. During the shutdown of the main fuel flow, the flows of auxiliary fuel and oxidizing gas which are directed toward the combustor 10 are increased to produce an "auxiliary switching flame". The auxiliary switching flame provides sufficient heat to the furnace 11 environment to prevent the cooling of the furnace 11, which normally results from either the shutdown of the main fuel flow or the introduction of purging combustion air from the checker 12, or both.

The invention further provides the capability to boost heat input to make up for the drop in the efficiency of the checker 12 over the period of the campaign due to refractory wearing and regenerator bed plugging. This invention provides the capability to make up for this loss in efficiency by providing additional heat input from the combustors 10, as obtained by the combustion of controlled amounts of auxiliary fuel and oxygen or auxiliary fuel, oxygen and air.

An additional application for this invention relates to providing a high momentum flame to impinge into a load during melting operations to provide heat input by using an auxiliary oxidizing stream without preheated combustion air. For example, if a large charge is provided, which interferes with combustion, the present invention allows the use of the auxiliary oxidizing stream as the sole oxidizer. The burner can be used to at least partially melt down the load, and the regenerative cycle can thereafter begin.

We claim:
1. A method of melting material in a regenerative furnace comprising the steps of:
    (a) directing a stream of preheated combustion air toward the interior of said furnace;
    (b) introducing controllable amounts of an auxiliary fuel into a combustion chamber;
    (c) introducing an auxiliary oxidizing gas into said combustion chamber so that said oxidizing gas mixes with said auxiliary fuel and combusts to produce hot combustion products;
    (d) directing a main fuel into said combustion chamber so that said main fuel is pyrolyzed by said hot combustion products to produce a hot luminous stream of combustible gas; and
    (e) directing said hot luminous stream of combustible gas from said combustion chamber to the interior of said furnace to mix with said combustion air to form a final luminous flame envelope to heat the material to be melted.

2. The method of claim 1, and further comprising controlling the flows of said combustion air, said main fuel, said auxiliary fuel, and said auxiliary oxidizing gas into said combustion chamber to produce a hot, luminous flame providing continuously optimal instant heat input.

3. The method of claim 1, and further comprising the steps of measuring the instant flow and the temperature of said combustion air and controlling the flows of said auxiliary fuel, and said auxiliary oxidizing gas into said combustion chamber to produce a hot, luminous flame providing continuously optimal instant heat input.

4. The method of claim 1, and further comprising the step of combusting auxiliary fuel and oxidizing gas in said combustion chamber in the absence of main fuel to produce an auxiliary switching flame directed to said furnace during a switching period for preventing cooling of the furnace during times when said main fuel is not being combusted.

5. The method of claim 4, and further comprising the steps of controlling the flows of said auxiliary fuel and said oxidizing gas into said combustion chamber to produce an auxiliary switching flame wih optimal heat input.

6. The method of claim 1, wherein said main fuel is natural gas.

7. The method of claim 1, wherein said auxiliary fuel is natural gas.

8. The method of claim 1, wherein said oxidizing gas is oxygen.

9. The method of claim 1, wherein said oxidizing gas is oxygen enriched air.

10. The method of claim 1, and further comprising the step of introducing a separate air stream to said combustion chamber as a part of said oxidizing gas to mix with said auxiliary fuel.

11. The method of claim 10, and further comprising the step of controlling the ratio of oxidizing gas to air for controlling the temperature of said final flame envelope.

12. The method of claim 10, and further comprising the step of controlling the ratio of oxidizing gas to air for controlling the temperature of said auxiliary switching flame.

13. The method of claim 1, which comprises the step, prior to the steps for melting said material in said regenerative furnace, of providing a high momentum flame to impinge into said material for the purposes of initially melting said material wherein the heat input for said flame is provided by using said auxiliary oxidizing gas as a sole oxidizer.

* * * * *